(12) United States Patent
Harpin

(10) Patent No.: US 6,327,396 B1
(45) Date of Patent: Dec. 4, 2001

(54) OPTICAL WAVEGUIDE HAVING AN OPTICALLY DECOUPLED MODULATOR REGION

(75) Inventor: Arnold Peter Roscoe Harpin, Oxford (GB)

(73) Assignee: Bookham Technology plc, Oxfordshire (GB)

(*) Notice: Subject to any disclaimer, the term of this patent is extended or adjusted under 35 U.S.C. 154(b) by 0 days.

(21) Appl. No.: 09/299,597

(22) Filed: Apr. 27, 1999

(30) Foreign Application Priority Data

Feb. 16, 1999 (GB) .................................................. 9903339

(51) Int. Cl.⁷ ....................................................... G02F 1/01
(52) U.S. Cl. ............................. 385/1; 385/3; 385/9; 385/2
(58) Field of Search .............................. 385/1–9, 14, 16, 385/22, 31, 40–42, 49, 50; 359/248, 250

(56) References Cited

U.S. PATENT DOCUMENTS 4,198,116 * 4/1980 Papuchon ................................... 385/9
5,559,912 * 9/1996 Agahi et al. ............................. 385/42
5,617,493 * 4/1997 Nishimto .................................. 385/40
5,689,358 * 11/1997 Nakao et al. .......................... 359/248
5,908,305 * 4/2000 Crampton et al. ........................ 385/2

FOREIGN PATENT DOCUMENTS 0 433 552 A2   6/1991   (EP) .
  2161027  *  1/1986   (GB) ......................................... 385/1

OTHER PUBLICATIONS

Udd, Eric, "Fiber Optic Sensors: An Introduction for Engineers and Scientists," John Wiley & Sons, Inc., 1991, pp. 134–135.

* cited by examiner

Primary Examiner—Frank G. Font
Assistant Examiner—Sang H. Nguyen
(74) Attorney, Agent, or Firm—Fleshner & Kim, LLP

(57) ABSTRACT

An optical waveguide, such as a rib waveguide, having a first portion (7) to which a dopant (9) and/or a metal layer (10) is applied to enable an optical property of a second portion of the waveguide to be altered, the first portion (7) having a structure, e.g. being corrugated, the geometry of which is such as to prevent an optical wave being carried in the first portion (7). The dopant (9) and/or metal layer (10) can thus be positioned close to the second portion which carries the optical wave without causing perturbation, e.g. attenuation and/or polarization, of the optical wave.

40 Claims, 2 Drawing Sheets

OPTICAL WAVEGUIDE HAVING AN OPTICALLY DECOUPLED MODULATOR REGION

BACKGROUND OF THE INVENTION

1. Field of the Invention

The invention relates to an optical waveguide having a region to which interacting means, such as a dopant or electrode, are applied for controlling an optical property of the a waveguide.

2. Background of the Related Art

It is known to apply dopant to a portion of the waveguide, for instance to form a p-n or p-i-n diode across the waveguide for injecting charge carriers into the waveguide and thus altering the effective refractive index of the waveguide. By this means a phase modulator can be provided such as the phase modulator disclosed in WO95/08787. However, in designing such a device, a compromise has to be made between the desire to maximise the overlap between the charge carriers injected into the waveguide and the optical mode therein while minimising the attenuation caused by overlap between the optical mode and the doped regions.

It is also known to apply a metal layer to a waveguide, e.g. to provide an electrical contact, or a heating element thereon. Again, there is a desire to position this as close as possible to the optical mode to maximise the effect of the electrical contact and/or heating but, on the other hand, the metal layer needs to be spaced from the optical mode so as to minimise absorption of one or both of its constituent TM or TE modes by tha metal layer.

There thus remains a need to be able to apply interacting means, such as dopant or an ohmic contact, to a waveguide without the interacting means itself causing substantial perturbation, such as attenuation or polarization, of an optical wave carried by the waveguide.

SUMMARY OF THE INVENTION

The present invention aims to provide a solution to the problems associated with the related art.

Thus, according to the present invention, there is provided an optical waveguide having a first portion to which interacting means are applied to enable an optical property of a second portion of the waveguide to be altered via said interacting means, the first and second portions each being formed of a light conducting material, the first portion having a structure the geometry of which prevents an optical wave being carried thereby, whereby the interacting means can be positioned in close proximity to the second portion without the interacting means itself causing a substantial perturbation of an optical wave carried by the second portion of the waveguide.

The present invention may be achieved in whole or in part by an optical waveguide, comprising: (1) a first light conducting portion having a structure that inhibits an optical wave from propagating therein; (2) a second light conducting portion adapted to guide the optical wave; and (3) interacting means positioned on the first light conducting portion such that the interacting means can alter an optical property of the second light conducting portion, wherein the interacting means is positioned so that it does not directly and substantially perturb the optical wave when the optical wave is propagating through the second light conducting portion.

The present invention may also be achieved in whole or in part by an optical waveguide, comprising: (1) a first waveguide portion; (2) a light guiding region within the first waveguide portion; (3) a second waveguide portion that inhibits light from propagating therein; and (4) a modulator having at least a portion that is positioned on or in the second waveguide portion, wherein the first waveguide portion, the second waveguide portion and the modulator are arranged such that the modulator can modulate an optical property of the light guiding region and such that, when light is guided by the light guiding region, the guided light is not substantially perturbed by the modulator.

The present invention may also be achieved in whole or in part by an optical waveguide comprising: (1) a silicon substrate; (2) an insulating layer on the silicon substrate; (3) a silicon layer on the insulating layer shaped into a first waveguide portion and a second waveguide portion, wherein the second waveguide portion is adapted to inhibit light from propagating therein; (4) a light guiding region within the first waveguide portion; and (5) a modulator having at least a portion that is positioned on or in the second waveguide portion, wherein the first waveguide portion, the second waveguide portion and the modulator are arranged such that the modulator can modulate an optical property of the light guiding region and such that, when light is guided by the light guiding region, the guided light is not substantially perturbed by the modulator.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements, wherein.

DETAILED DESCRIPTION OF PREFERRED EMBODIMENTS

Figure 1:
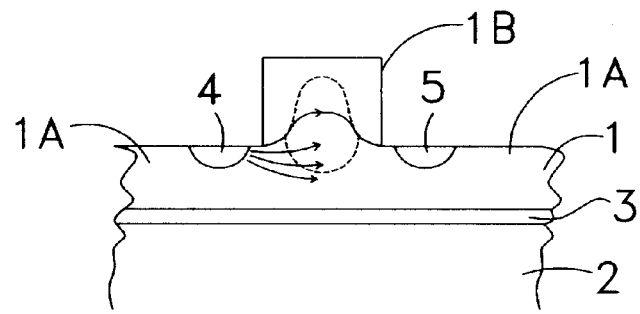
FIG. 1 is a schematic cross-sectional view of a related art diode formed across a rib waveguide.

FIG. 1 shows a rib waveguide formed in a light conducting material 1 (preferably a silicon layer), which is separated from a silicon substrate 2 by an insulating layer 3 of silicon dioxide. Such waveguides are described further in WO95/08787 and the references given therein. A diode can be formed across the waveguide by providing a doped region on each side thereof, e.g. a p-doped region 4 on one side of the waveguide and a n-doped region 5 on the other side thereof, e.g. to form a phase modulator. The doped regions may be formed in the top surface of a slab region 1A of the light conducting material 1 on either side of the rib 1B formed therein as shown in FIG. 1. It should be noted that with this form of waveguide, the waveguide is provided not just by the rib 1B but also by the slab region 1A beneath the rib and, to some extent, the slab region on either side of the rib 1B. This is shown by the position of the optical mode which is depicted by dashed lines in FIG. 1. It will also be appreciated that an optical wave traveling along the waveguide also includes exponentially decaying portions extending both laterally and vertically from the concentrated part of the optical mode illustrated in FIG. 1.

It should be noted that the devices shown in the Figures would usually have an oxide layer formed over the light conducting material [silcon layer] 1, but this is not shown in the Figures.

It should be noted that the devices shown in the Figures would usually have an oxide layer formed over the silicon layer 1, but this is not shown in the Figures.

The arrangement shown in FIG. 1 is preferred to an arrangement in which the doped regions are provided in the side faces of the rib 1B as, by positioning the doped regions in the slab regions 1A on either side of the rib 1B, overlap between the doped regions 4 and 5 and the optical mode is reduced. Nevertheless, part of the optical mode, and in particular the exponentially decaying part of the wave on either side thereof may still be attenuated to some extent by the presence of the doped regions 4 and 5. Furthermore, the positions of the doped regions 4 and 5 and the slab regions 1A on either side of the rib 1B leads to a less than optimal overlap between the injected charge carriers and the optical mode, as a significant proportion of the current between the doped regions 4 and 5 passes beneath the concentrated area of the optical mode. The current paths from the p-doped regions 4 to the n-doped regions 5 are shown by arrows in FIG. 1. To improve the overlap between the injected carriers and the optical mode, it would be preferable to provide a doped region on top of the waveguide rib 1B, e.g. a p-doped region, and complementary doped regions in the slab regions on either side of the rib 1B, e.g. n-doped. However, a disadvantage of such a structure is that the overlap between the optical mode and the doped region on top of the rib 1B would introduce unacceptable attenuation of the optical mode.

Figure 2:
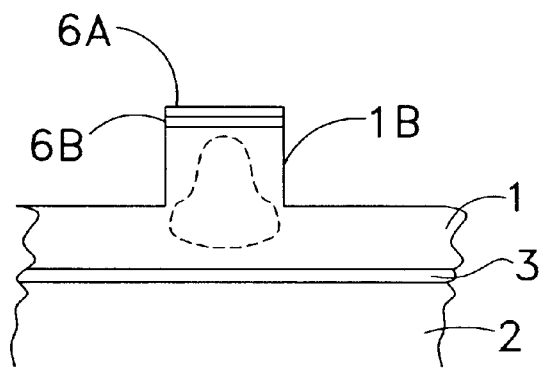
FIG. 2 is a schematic cross-sectional view of a related art arrangement of a heating element applied to a rib waveguide.

FIG. 2 also shows a rib waveguide formed in a silicon-on-insulator (SOI) chip, in this case with a metal layer 6A and oxide layer 6B formed thereon. The metal layer 6A may be used as a resistance heater to heat the waveguide, for example to form a thermal modulator. However, unless the oxide layer 6B is thick, the metal layer 6A absorbs a portion of the optical mode travelling in the waveguide, e.g. the TM mode, and thus causes polarization of the wave. If a thick oxide layer 6B is used, this greatly reduces the effect of the heater as the oxide 6B has a relatively low thermal conductivity.

Figure 3:
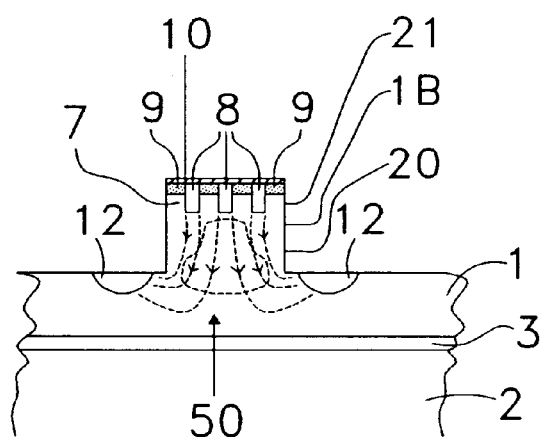
FIG. 3 is a schematic cross sectional view of an optical waveguide according to a first embodiment of the invention.

FIG. 3 shows a phase modulator according to an embodiment of the invention, which helps overcome the problems discussed in relation to the modulator shown in FIG. 1. This is achieved by modifying the structure of a light conducting material 1, preferably a silicon layer 1, with a rib portion 1B protruding therefrom with a first light conducting portion 21 or first portion 21 of the waveguide to which the dopant 9 is applied, in the example shown, this being the upper surface of the rib 1B, by forming corrugations 7 therein. The first light conducting portion of the waveguide being formed on a second light conducting portion 20 or a second portion 20 of the waveguide. The illustrated embodiment comprises four corrugations 7 with three grooves 8 therebetween. The geometry of the corrugations 7 is such that their effective refractive index is too low to allow the optical mode guided by the rib 1B to penetrate into the corrugations 7. The optical mode carried within the light guiding region 50 of the second portion 20 of the rib waveguide is thus excluded from the corrugated region of the waveguide. The first doped regions 9 of the first dopant 9 can thus be formed in the corrugations 7 in close spacial proximity to the optical mode, but will not interact optically with the optical mode in the second portion 20 of the waveguide as the optical mode is excluded from tile corrugations 7. The first dopants 9 are in the first doped regions 9 provided in the corrugated portion of the waveguide and may be p-doped, and the second dopants 12, which may be n-doped in the second doped regions 12 are provided in the slab region on either side of the rib 1B. In this way, doping the top of the waveguide rib 1B can be achieved without introducing significant further loss and the current flow between the second doped regions 12 and the first doped regions 9 passes through a much greater proportion of the optical mode and so has a greater effect thereon.

Although in the illustrated embodiments of the present invention a corrugated geometry is used for the structure of the first waveguide portion, it should be appreciated that other geometries that inhibit the optical mode from propagating in the first waveguide portion may be used without departing from the spirit and scope of the present invention.

Alternatively, the n-doped regions may be provided in further corrugated regions (not shown) provided in the slab region on either side of the rib 1B and/or on the side faces of the rib 1B, or may be provided on the underside of the waveguide.

The doped regions are preferably formed by implantation as this enables the depth of penetration of the dopant into the silicon to be carefully controlled and thus kept low. Diffusion doping can, however, be used if a short drive in period is used. The majority of the dopant is preferably contained within the upper half, or less, of the height of the corrugations 7. Preferably, no dopant extends beyond the point where the corrugations 7 meet the waveguide rib 1B.

The first doped region 9 can be contacted by a metal layer provided on the distal or upper surface of each corrugation 7 or a single metal layer 10 may be provided across the upper surfaces of the corrugations 7 if the grooves 8 therebetween are filled with some other material of sufficiently low refractive index (not shown), such as silicon dioxide or a polymer such as polymethylmethacrylate (PMMA), which acts as a cladding rather than a light conductor. The metal layer 10 does not absorb part of the optical mode as the optical mode is effectively excluded from the corrugated region of the waveguide, as described above. The first doped regions 9 and the metal layer 10 can be referred to as modulators 30 or interacting means 30, as both the first doped regions 9 and the metal layer 10 modulate an optical property of the light guiding region and interact with the optical mode.

Figure 4:
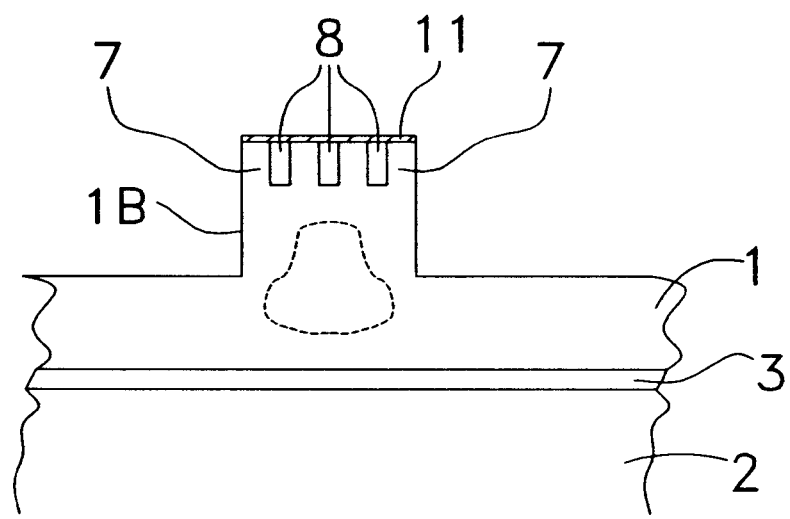
FIG. 4 is a schematic cross-sectional view of an optical waveguide according to a second embodiment of the invention.

In a similar manner, a thermal modulator can be formed as shown in FIG. 4, with a corrugated region on the upper surface of the rib 1B, with the grooves 8 filled by silicon dioxide or PMMA 8A, and a metal layer 11 in the form of a resistance heater applied across the upper surface of the corrugations. The thermal conductivity of the corrugated region is significantly improved compared to the arrangement shown in FIG. 2 in which an oxide layer (having poor thermal conductivity) is provided between the metal layer 6 and the rib 1B to reduce the perturbation caused by the presence of the metal layer.

The rib waveguide 1B is preferably approximately 4 microns high measured from the silicon dioxide layer (and excluding the corrugations), and preferably approximately 4 microns wide. In this case, the three grooves 8 are peferably approximately 0.35 to 1.0 microns wide and approximately 0.35 to 1.0 microns deep. The size of the corrugations 7 preferably fall in the same range, with the grooves 8 and corrugations 7 preferably being of a similar width. The width and depth of the grooves, the number of grooves (and hence the number of corrugations) and the width of the corrugations will, however, depend on the dimensions of the waveguide and their geometry is selected so as to ensure substantially no, or very little, optical power is carried in the corrugated portion of the rib waveguide 1B. If the light to be guided by the rib waveguide 1B has a wavelength in the range 1.2 to 1.7 microns, the corrugations 7 preferably have a width of 0.5 microns or less.

The corrugated region may be formed by etching grooves 8 in the upper surface of the rib 1B (which is preferably made slightly taller to allow for this). Alternatively, the corrugated region may be formed by growing or depositing the corrugations 7 on the upper surface of the rib 1B.

The corrugated region should comprise at least one corrugation 7 or at least one groove 8 but preferably a plurality of corrugations 7 and/or grooves 8 are provided so the doped regions 9 are spread out rather than being too localised (which would lead to high current densities in a diode formed across the waveguide).

Figure 5:
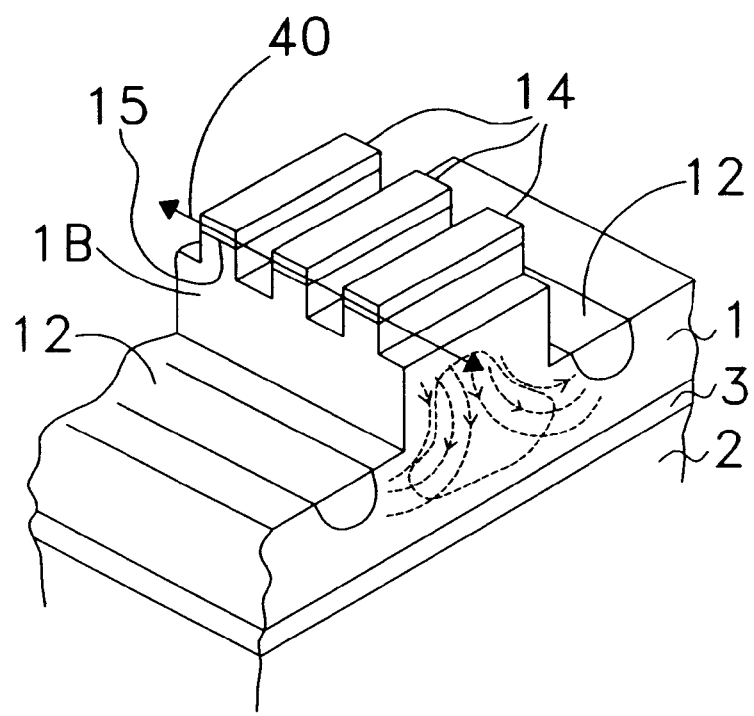
FIG. 5 is a schematic perspective view of an optical waveguide according to a third embodiment of the invention.

The corrugations 7 and grooves 8 in the embodiments described above are shown to be parallel to the waveguide axis or optical axis 40 of the waveguide but in other embodiments this need not be so. Grooves 8 or corrugations 7 may, for instance, be formed across a waveguide as shown in FIG. 5, which shows a rib waveguide similar to that of FIG. 3 but with corrugations 14 extending across the upper surface of the rib 1B, which can be substantially perpendicular to the optical axis 40 of the waveguide. The upper portions 15 of the corrugations 14 may then be doped and/or a metal layer (not shown) may then be applied to the upper surface of the corrugated portion (with the grooves filled by silicon dioxide or some other material). It will be appreciated that grooves extending laterally across the waveguide reduce the effective refractive index of the corrugated region so light cannot travel therein. The dimensions and period of these grooves are preferably in the same range as for the embodiment described above in relation to FIG. 3.

The above examples relate to a rib waveguide formed on a silicon-on-insulator chip. Similar arrangements may, however, be used with waveguides formed of other materials and other forms of waveguide, e.g. a slab waveguide, provided they permit the formation of a structure the geometry of which prevents light being carried thereby.

Other structures having a geometry which excludes light from a region of the waveguide may also be used beside the corrugations described above, e.g. a lattice of grooves or of corrugations. The periodic nature of the structure may also be regular or irregular.

The foregoing embodiments are merely exemplary and are not to be construed as limiting the present invention. The present teaching can readily applied to other types of apparatuses. The description of the present invention is intended to be illustrative, and not to limit the scope of the claims. Many alternatives, modifications, and variations will be apparent to those skilled in the art. In the claims, means-plus-functions are clauses are intended to cover the structures described herein as performing the recited function and not only structural equivalents, but also equivalent structures. For example, although silicon dioxide and polymethylmethacrylate (PMMA) may not be structural equivalents in that PMMA is a polymer, whereas silicon dioxide is not a polymer, in the environment of low refractive index materials, silicon dioxide and PMMA may be equivalent structures.

What is claimed is:

1. An optical waveguide, comprising:
   a first light conducting portion formed of a light conducting material and formed to inhibit an optical wave from propagating therein, wherein the first light conducting portion has a formation to reduce the effective refractive index of the first light conducting portion to substantially exclude an optical wave from being carried by the first light conducting portion;
   a second light conducting portion formed of a light conducting material and adapted to guide the optical wave; and
   interacting means positioned on the first light conducting portion such that the interacting means can be used to alter an optical property of the second light conducting portion, wherein the interacting means is positioned adjacent to the second light conducting portion so that the presence of the interacting means does not directly and substantially perturb the optical wave when the optical wave is propagating through the second light conducting portion.

2. The optical waveguide of claim 1, wherein the first light conducting portion formation comprises a corrugated structure comprising at least one corrugation and at least one groove.

3. The optical waveguide of claim 1, wherein each of the at least one corrugations has a width in the range of approximately 0.35 micron to approximately 1 micron.

4. The optical waveguide of claim 2, wherein the interacting means comprises dopant within at least one of the corrugations.

5. The optical waveguide of claim 4, wherein a majority of the dopant is contained within an upper half of the height of the at least one corrugation.

6. The optical waveguide of claim 2, wherein the at least one corrugation has a height in the range of approximately 0.35 micron to approximately 1.0 micron.

7. The optical waveguide of claim 2, wherein the at least one corrugation and the at least one groove are substantially parallel to an optical axis of the waveguide.

8. The optical waveguide of claim 2, wherein the at least one corrugation and the at least one groove are substantially perpendicular to an optical axis of the waveguide.

9. The optical waveguide of claim 2, wherein the optical waveguide is located within a rib formed within a silicon layer of a silicon-on-insulator (SOI) chip.

10. The optical waveguide of claim 1, wherein the first light conducting portion formation comprises a corrugated structure comprising a plurality of corrugations and/or a plurality of grooves.

11. The optical waveguide of claim 10, wherein each of the plurality of corrugations and/or grooves has a width in the range of approximately 0.35 micron to approximately 1.0 micron.

12. The optical waveguide of claim 10, wherein the interacting means comprises dopant in each of the plurality of corrugations.

13. The optical waveguide of claim 12, wherein a majority of the dopant is contained within an upper half of the height of the plurality of corrugations.

14. The optical waveguide of claim 10, wherein each of the plurality of corrugations has a height in the range of approximately 0.35 micron to approximately 1.0 micron.

15. The optical waveguide of claim 1, wherein the interacting means comprises dopant within the first light conducting portion.

16. The optical waveguide of claim 15, further comprising dopant within another portion of the waveguide, which is not the first or second light conducting portions of the waveguide that, together with the dopant within the first light conducting portion, form a diode.

17. The optical waveguide of claim 16, wherein the diode forms at least a portion of a phase modulator.

18. The optical waveguide of claim 1, wherein the interacting means comprises a metal layer.

19. The optical waveguide of claim 18, wherein the first light conducting portion formation comprises a corrugated structure comprising at least one corrugation and at least one groove, and wherein the metal layer is provided on a distal surface of the at least one corrugation.

20. The optical waveguide of claim 19, wherein the at least one groove is filled with a material, and wherein the metal layer extends across a distal end of the at least one corrugation and across the at least one filled groove.

21. The optical waveguide of claim 18, wherein the first light conducting portion formation comprises a corrugated structure comprising a plurality of corrugations and a plurality of grooves, and the metal layer is provided on a distal surface of each of the plurality of corrugations.

22. The optical waveguide of claim 21, wherein each of the plurality of grooves is filled with a material, and wherein the metal layer extends across distal ends of the plurality of corrugations and across the plurality of filled grooves.

23. The optical waveguide of claim 21, wherein each of the plurality of grooves is filled with a cladding layer, and wherein the metal layer covers top portions of the plurality of corrugations and the plurality of filled grooves.

24. The optical waveguide of claim 23, wherein the cladding layer comprises silicon dioxide or polymethylmethacrylate.

25. The optical waveguide of claim 1, wherein the first and second light conducting portions are arranged to form a rib waveguide.

26. The optical waveguide of claim 25, wherein the first light conducting portion forms an upper portion of the rib waveguide.

27. The optical waveguide of claim 1, wherein the first and second light conducting portions are formed within a rib of a silicon-on-insulator chip.

28. The optical waveguide of claim 1, wherein the first light conducting portion and the second light conducting portion are formed in at least one rib of a silicon layer, wherein the silicon layer comprises a slab with at least one rib portion protruding therefrom.

29. An optical waveguide, comprising:
a second waveguide portion formed of a light conducting material;
a light guiding region within the second waveguide portion;
a first waveguide portion formed of a light conducting material on a top portion of said second waveguide portion and having a formation that inhibits light from propagating therein; and
a modulator having at least a portion of the modulator positioned either on a majority of the top portion or in the top half of the first waveguide portion;
wherein the first waveguide portion, the second waveguide portion and the modulator are arranged such that the modulator can modulate an optical property of the light guiding region and such that, when light is guided by the light guiding region, the presence of the modulator does not directly and substantially perturb the guided light.

30. The optical waveguide of claim 29, wherein the first waveguide portion formation comprises a corrugated structure.

31. The optical waveguide of claim 29, wherein the modulator comprises a phase modulator.

32. The optical waveguide of claim 29, wherein the modulator comprises:
a first dopant in the first waveguide portion; and
a second dopant in the optical waveguide, but not in the first or second waveguide portions.

33. The optical waveguide of claim 29, wherein the modulator comprises a metal layer on the top portion of the majority of the first waveguide portion.

34. The optical waveguide of claim 29, wherein the optical waveguide is located within a rib formed within a silicon layer of a silicon-on-insulator (SOI) chip.

35. An optical waveguide, comprising:
a silicon substrate;
an insulating layer on the silicon substrate;
a silicon layer on the insulating layer shaped into a slab with at least one lib portion protruding therefrom, wherein each of said at least one rib portion comprises,
a first waveguide portion, and
a second waveguide portion, wherein the first waveguide portion comprises a formation to inhibit light from propagating therein;
a light guiding region within the second waveguide portion; and
a modulator having at least a portion of the modulator that is positioned either on or in the first waveguide portion;
wherein the first waveguide portion, the second waveguide portion and the modulator are arranged such that the modulator can modulate an optical property of the light guiding region and such that, when light is guided by the light guiding region, the presence of the modulator does not directly and substantially perturb the guided light.

36. The optical waveguide of claim 35, wherein the first waveguide portion is located on a top portion of the second waveguide portion and wherein the first waveguide portion formation comprises a corrugated structure.

37. The optical waveguide of claim 36, wherein the modulator comprises a dopant and wherein a majority of the dopant is contained within the top half of the corrugated structure.

38. The optical waveguide of claim 35, wherein the modulator comprises a phrase modulator.

39. The optical waveguide of claim 35, wherein the modulator comprises:
a first dopant in the first waveguide portion; and
a second dopant in the slab and not in the at least one rib portion protruding therefrom.

40. The optical waveguide of claim 35, wherein the modulator comprises a metal layer on the first waveguide portion.

* * * * *